US012414885B2

(12) United States Patent
Zamirpour

(10) Patent No.: US 12,414,885 B2
(45) Date of Patent: Sep. 16, 2025

(54) MEDICAL BED AND MULTIFUNCTIONAL MATTRESS ASSEMBLY

(71) Applicant: Payman Zamirpour, Houston, TX (US)

(72) Inventor: Payman Zamirpour, Houston, TX (US)

( * ) Notice: Subject to any disclaimer, the term of this patent is extended or adjusted under 35 U.S.C. 154(b) by 318 days.

(21) Appl. No.: 18/121,113

(22) Filed: Mar. 14, 2023

(65) Prior Publication Data

US 2023/0285210 A1 Sep. 14, 2023

Related U.S. Application Data

(60) Provisional application No. 63/269,295, filed on Mar. 14, 2022.

(51) Int. Cl.
*A61G 7/02* (2006.01)
*A61G 9/00* (2006.01)

(52) U.S. Cl.
CPC ............... *A61G 7/02* (2013.01); *A61G 9/003* (2013.01); *A61G 2203/34* (2013.01); *A61G 2203/46* (2013.01)

(58) Field of Classification Search
None
See application file for complete search history.

(56) References Cited

U.S. PATENT DOCUMENTS

| | | | | |
|---|---|---|---|---|
| 3,719,962 A * | 3/1973 | Burkley | A61G 7/02 | 5/604 |
| 5,729,848 A * | 3/1998 | Yamagishi | A61G 7/02 | 4/584 |
| 9,918,887 B1 * | 3/2018 | Wolter, III | A61G 7/02 | |
| 2013/0298330 A1 * | 11/2013 | Lachenbruch | A61G 7/057 | 5/606 |
| 2014/0082843 A1 * | 3/2014 | Papadakos | A47C 23/34 | 5/613 |
| 2014/0259420 A1 * | 9/2014 | Lambarth | A61G 1/0567 | 5/618 |
| 2017/0216116 A1 * | 8/2017 | Lai | A61G 7/015 | |
| 2019/0328146 A1 * | 10/2019 | Palashewski | A61G 7/018 | |
| 2020/0206050 A1 * | 7/2020 | Lai | A47K 7/08 | |

* cited by examiner

*Primary Examiner* — Adam C Ortiz
(74) *Attorney, Agent, or Firm* — Womble Bond Dickinson (US) LLP

(57) ABSTRACT

The present disclosure provides for medical beds and methods related thereto. In certain embodiments, the present disclosure relates to non-electric medical beds capable of assisting caregivers in supportively repositioning non-ambulatory individuals for receiving medical and/or non-medical treatment. In some embodiments, methods for reducing the risk of injury and discomfort for patients utilizing the disclosed medical beds are provided.

20 Claims, 9 Drawing Sheets

300

600

600

600

600

MEDICAL BED AND MULTIFUNCTIONAL MATTRESS ASSEMBLY

CROSS-REFERENCE TO RELATED APPLICATION

This application claims priority to and the benefit of U.S. Provisional Application No. 63/269,295, filed Mar. 14, 2022. The contents of the referenced application are incorporated into the present application by reference herein in its entirety for all purposes.

TECHNICAL FIELD

The present disclosure relates to medical beds and methods related thereto. Embodiments of the present disclosure relate to non-motorized beds and mattresses designed to assist caregivers in supportively repositioning individuals for receiving care and treatment.

BACKGROUND

In view of the increasingly aging population in many parts of both the developed and developing world, there is a corresponding demand for cost-effective health care solutions for both on-site care, such as at hospitals, nursing homes, and convalescent centers, as well as in-home care for recovering patients and those in need of either transient or permanent living assistance. For many infirm or otherwise immobile patients, a hospital bed is a critical component for promoting recovery or ensuring minimal discomfort and inconvenience during care.

However, many hospital beds present challenges to both patients and caregivers due to factors including patient immobility, patient fragility or an inability of a caregiver to sufficiently reposition the patient without imparting discomfort or potential injury. While electric and mechanized hospital beds are commercially available for assisting caregivers in treating such immobilized patients, the exorbitant costs associated with purchasing and maintaining them is often prohibitively expensive for health care facilities or homebound caregivers.

SUMMARY OF THE DISCLOSURE

Applicant has recognized the challenges and issues noted above and herein. Accordingly, the present disclosure is direct to embodiments of medical beds and methods for providing caregiving activities to individuals confined to the medical beds disclosed herein, including methods directed to the positioning and stabilization of a patient receiving caregiving activities, such as from a healthcare worker or personal caregiver. The disclosed medical beds and methods, in certain embodiments, beneficially reduce the risk of patient discomfort or injury while eliminating the costly requirement for electric, motorized, and/or mechanized functionality or equipment associated with the use of previously reported hospital beds.

The present disclosure, in certain embodiments, provides for a medical bed with a multisectional mattress assembly. The multisectional mattress assembly includes two or more separable sections and a first, sealable orifice positioned within and vertically traversing the multisectional mattress assembly; a removable fenestrated support dimensionally aligned and positioned below the multisectional mattress assembly and having a first orifice in operable contact with the sealable orifice; a first removable reservoir having a second orifice in operable contact with the sealable orifice and the first orifice, the first removable reservoir being positioned in between the multisectional mattress assembly and the removable fenestrated support; a bed frame with a plurality of bed frame supports configured to support the multisectional mattress assembly and the removable fenestrated support; and a second removable reservoir positioned below the bed frame. In certain aspects, the sealable orifice includes at least one separable section of the multisectional mattress assembly and is in operable contact with the removable fenestrated support, the first removable reservoir, and the second removable reservoir. In some aspects, the first removable reservoir and the second removable reservoir are individually selected from a removable fluid collection support and a removable fluid collection reservoir, respectively.

In some aspects, the sealable orifice includes at least one separable section of the multisectional mattress assembly. For instance, the at least one separable section of the multisectional mattress assembly may include a continuous single section, a segmented single section, or a plurality of sections that is positioned within the center of the multisectional mattress assembly for facilitating one or more patient care activities. The patient care activities may include, but are not limited to, showering and bathing activities and excreta-based activities such as defecating and urinating. In embodiments, the sealable orifice is configured to receive a removable conduit positioned within and vertically traversing the sealable orifice upon removal of the at least one separable section of the multisectional mattress assembly. The removable conduit may include any suitable shape, for example, a conical shape, a cylindrical shape, or an angular shape, such as a triangular or square shape, where the shape of the removable conduit may be selected based on the type of caregiving activity or activities. For example, a conically-shaped conduit may be utilized for activities related to the removal of excreta, while a cylindrically-shaped conduit may be employed for bathing, showering, or related washing activities.

In alternative embodiments, the removable conduit and the sealable orifice are integrated within the at least one separable section of the multisectional mattress assembly. In a non-limiting example, the removable conduit may permanently reside in a section of the multisectional mattress assembly that is positioned within the center of the multisectional mattress assembly for facilitating patient care activities as described herein. For instance, the retainment of the removable conduit may be beneficial in instances where a patient needs to produce excreta and physically repositioning or moving the patient may not be possible for a length of time and/or where timely or continual caregiving may not be readily available to the patient. In related aspects, the removable conduit may further include one or more attachments and/or appendages for better serving the requirements of the patient and/or better assisting the caregiver in providing patient care, including but not limited to a removable toilet seat, a permanently-affixed toilet seat, or a bed pan. In some embodiments, the removable conduit may be equipped with one or more sealable hatches. For instance, the sealable hatches may include opposing ends capable of being closed via threaded caps, latchable caps, magnetically-sealable caps, or combinations thereof. The sealing of one or both ends of the removable conduit may be desirable in the performance of one or more caregiving activities, for instance where the lower/distal end of the removable conduit is capped for the passive collection of excreta samples or for the collection of additional body fluid or material samples from the patient for submitting the samples for a diagnostic assay.

In certain aspects, the multisectional mattress assembly of the disclosed medical bed includes one or more longitudinal seams, latitudinal seams, diagonal seams, circumferential seams or combinations thereof. For example, a section of the multisectional mattress assembly that is positioned within the center of the multisectional mattress assembly may include circumferential seams for best covering and uncovering the orifice that is positioned within and vertically traversing the multisectional mattress assembly as described herein. In this regard, the choice of seam(s), as well as the number of seams and corresponding sections including the multisectional mattress assembly, may be selected based on the needs of the patient and/or caregiver(s), such as incorporating a vertical seam that traverses the length of the multisectional mattress assembly for simplifying the process of performing a (lengthwise) separation of the multisectional mattress assembly.

In related embodiments, the two or more sections of the multisectional mattress assembly may be connected or enjoined by any suitable fastener(s), including but not limited to zipper based fasteners, button based fasteners, metal snap based fasteners, clip based fasteners, hook and loop fasteners and combinations thereof. For instance, in certain aspects the multisectional mattress assembly may include three separable sections, which are separable by 1) a vertical seam that traverses the length of the multisectional mattress assembly for separably connecting two lengthwise sections of the multisectional mattress assembly; and 2) a circumferential seam that includes at least one separable section of the multisectional mattress assembly and is capable of sealing an orifice within the multisectional mattress assembly. The at least one separable section of certain aspects may be removed for the purposes of introducing, for example, a removable conduit that may be positioned within and vertically traversing the sealable orifice.

In some aspects, the removable fluid collection reservoir for use in the disclosed medical bed is partitioned for the purposes of receiving and subsequently separating excreta based waste (such as urine and fecal matter) and non-excreta based waste, including wash water, waste water, non-excreta based bodily fluids and/or matter (such as blood, mucous, saliva, and tissue fluid(s)). In alternative embodiments, the removable fluid collection reservoir may include a dedicated reservoir for excreta based waste, such as for instances in which such a dedication of the reservoir may be necessary, including during periods of gastrointestinal distress, illness, and/or infection. The removable fluid collection reservoir may also, in embodiments, be dedicated to the reception of non-excreta based waste, such as the reception of wash water during a normal or extended wash period for a patient, or during the cleaning and/or sterilization of one or more components of the disclosed medical bed.

The disclosed medical bed may further include any number of bed types and/or arrangements and may further include additional components and features known to those of skill in the art for benefitting the patient and/or caregiver(s). For example, in certain embodiments the medical bed of the instant disclosure may be selected from a manual bed, a Gatch bed, a burn recovery bed, a ward bed, and a field hospital bed. The medical bed may further include modified versions of the foregoing bed types for the purposes of best accommodating the needs of the patient, the caregiver(s) or both. In related aspects, the medical bed may further include either a removable caster wheel assembly or a fixed (non-removable) caster wheel assembly that is operably connected to the bed. Additionally, embodiments directed to the use of a headboard and/or a footboard may be incorporated in the disclosed medical bed.

In still further aspects, the medical bed of the present disclosure may include one or more of a hospital bed trapeze, a medical trapeze, an overhead trapeze, one or more bed assist rails, an adjustable medical bedside table, and a medical bedside tray. In further embodiments, additional equipment such as one or more fans or blowers may be installed or placed in sufficient proximal location to the disclosed medical bed and utilized, in non-limiting aspects, for the cooling and/or drying of the patient, the medical bed, or both. For instance, a fan or blower may be permanently installed above the medical bed or may alternatively be affixed to a medical trapeze or racking system and positioned above the medical bed, for drying the patient following an in-bed shower or washing activity.

In accordance with various aspects of the disclosure, the components that include the medical bed are not particularly or unduly limited to the types of materials and/or compositions that may be utilized for their production. For instance, the reservoirs of the medical bed, including the first removable reservoir, the second removable reservoir, and the removable fluid collection reservoir, may include one or more of a polymeric composition, a fibrous composition, a metallic composition, a gelatinous composition, and a ceramic composition. Similarly, the multisectional mattress assembly, bed frame, and/or removable conduit described herein may likewise include or consist of one or more of a polymeric composition, a fibrous composition, a metallic composition, a gelatinous composition, and a ceramic composition. The choice of material(s) for constructing any one or more of the components of the disclosed medical bed, including any optional or alternative components, may be determined by one or more factors such as cost benefit, weight, durability, ease of cleaning, sterilizability, and so forth. The disclosed medical bed may further be equipped with optional sensors or related items for assisting in, for example, the real-time monitoring of one or more of a patient's physiological conditions. In this regard, the disclosed medical bed may, in embodiments, include one or more of a medical bed sensor, a moisture sensor, a pressure sensor, and/or a thermal sensor. Any such sensors or related equipment may be utilized by one or more caregivers for monitoring a patient either on-site or remotely, including embodiments where, for example, the physiological condition of a homebound patient is monitored by a caregiver located at a medical facility or other offsite location.

In additional aspects, the present disclosure provides for a method for repositioning and stabilizing an infirm individual on a medical bed as disclosed herein for one or more caregiving activities, including: moving the individual from a first position on a multisectional mattress assembly to a second position on the multisectional mattress assembly for accessing the sealable orifice; unsealing the sealable orifice by removing the separable section in the sealable orifice of the multisectional mattress assembly; moving the individual to a third position to optimize contact with the unsealed orifice for performing at least one caregiving activity; repositioning the individual in the second position following the performance of at least one caregiving activity; resealing the sealable orifice by replacing the separable section of the multisectional mattress assembly; and returning the individual to the first position on the multisectional mattress assembly. In related aspects, the caregiving activities can include any standard or specialized caregiver activity or medical/physiological assessment, including but not limited to bathing activities, excreta activities, a physical examination, a medical assessment, dressing activities, feeding activities, and combinations thereof. In certain embodiments, methods for repositioning and stabilizing a convalescent or an infirm individual for one or more caregiving activities (including medical/physiological assessments or treatments), may include unsealing the sealable orifice by removing at least one separable section of the multisectional mattress assembly and further include introducing a removable conduit that is in operable contact with the first removable reservoir, for example, a removable fluid collection support, such that any excreta, wash water, and/or other waste may be subsequently collected in the second removable reservoir, such as a removable fluid collection reservoir, for disposal.

In additional aspects, the present disclosure provides for a method of assembling a medical bed. The method includes providing a bed frame configured to support a patient; positioning, on the bed frame, a fluid collection support having at least one sloped wall and a first orifice defined through the at least one sloped wall; positioning, on the fluid collection support, a fenestrated support having a second orifice defined therethrough; positioning, on the fenestrated support, a multisectional mattress assembly having two or more separable sections and a sealable orifice positioned within and vertically traversing the multisectional mattress assembly; providing, between the multisectional mattress assembly and the fenestrated support, a first removable reservoir in operable contact with the sealable orifice and the second orifice; and positioning, below the bed frame, a second removable reservoir configured to receive fluid generated during use of the medical bed via a flow path defined between the first orifice, the second orifice, and the sealable orifice.

BRIEF DESCRIPTION OF DRAWINGS

The foregoing embodiments and other features, aspects, and advantages of the disclosure will become better understood with regard to the following descriptions, claims, and accompanying drawings. It is to be noted, however, that the drawings illustrate only several embodiments of the disclosure and, therefore, are not to be considered limiting of the breadth and scope of the disclosure.

While particular or specific features and embodiments may be depicted in certain individual drawings and absent in other drawings, the skilled artisan will appreciate that the features and embodiments of the drawings may be partially or completely combined in accordance with various teachings of the instant disclosure.

DETAILED DESCRIPTION

So that some of the various features and advantages of the embodiments and aspects of the hospital bed and methods disclosed herein, as well as others, which will become apparent, may be understood in greater detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the hospital bed and methods disclosed herein and are therefore not to be considered limiting of the breadth and scope of the hospital bed and methods disclosed herein.

In one or more embodiments, such as those illustrated in FIGS. 1-9, the present disclosure is directed to medical beds and methods related thereto, including methods for moving, repositioning, and supporting patients residing in the disclosed medical beds. The medical beds disclosed herein provide safe, efficient, and cost-effective solutions to challenges previously faced by patients and caregivers, without the extreme costs of existing mechanized hospital beds.

Figure 1:
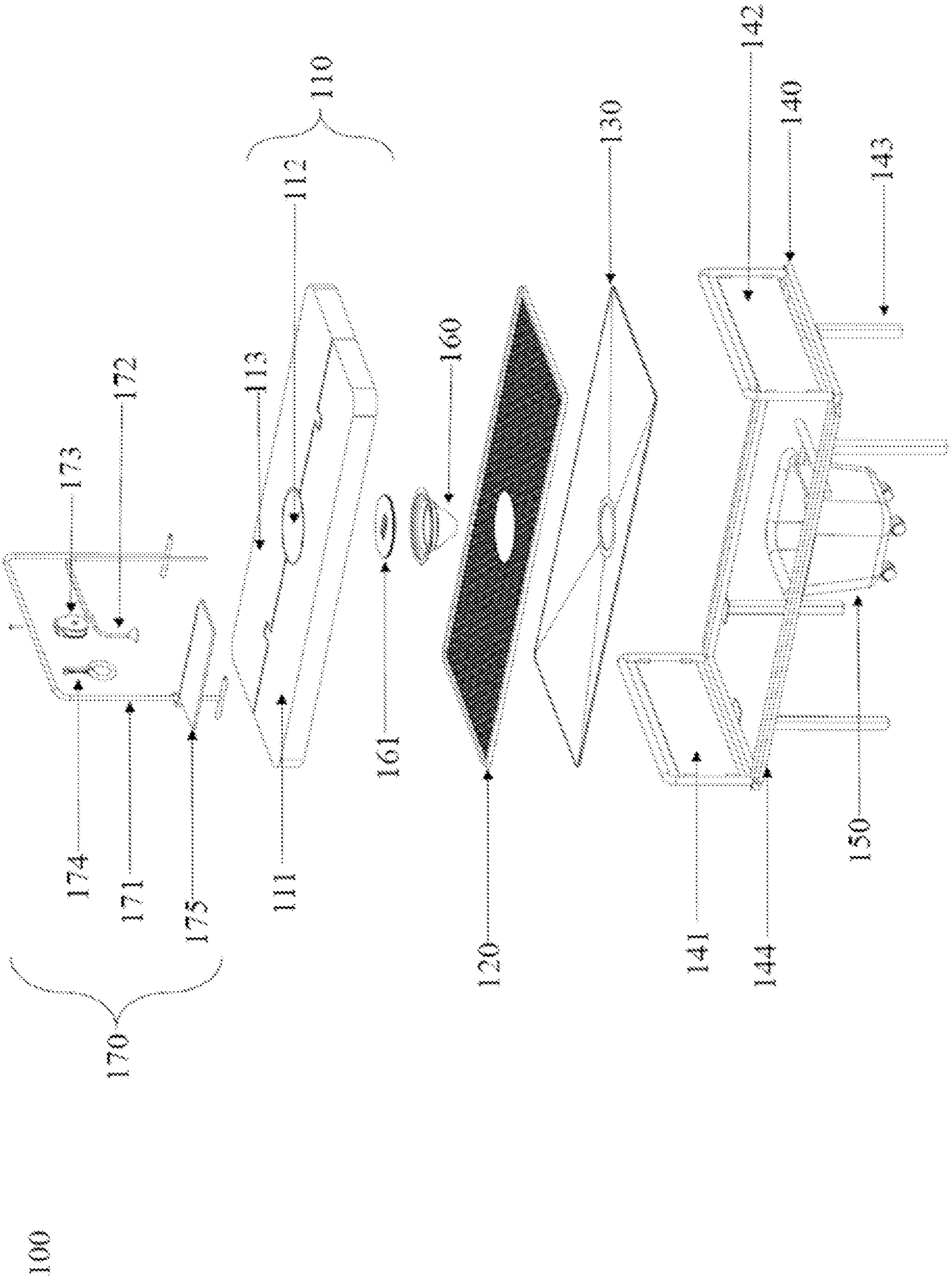
FIG. 1 is an exploded schematic diagram illustration of a medical bed, according to certain embodiments of the disclosure.

In certain aspects, the present disclosure is directed to a medical bed having one or more components, such as a multisectional mattress assembly, a removable fenestrated support, a first removable reservoir (such as a removable fluid collection support), a bed frame, and a second removable reservoir (such as a removable fluid collection reservoir). As shown in FIG. 1, a medical bed 100 of certain embodiments includes a multisectional mattress assembly 110 that includes or is formed by three separable sections, including two separable, longitudinal sections 111 and 113 and a circumferential, separable section 112. The circumferential, separable section 112 may be shaped to form a cover or sealant for a sealable orifice positioned within and vertically traversing the multisectional mattress assembly 110. In additional aspects, a removable fenestrated support 120 is provided that includes an orifice in operable connection with the aforementioned sealable orifice of the multisectional mattress assembly 110. The removable fenestrated support 120 is generally positioned below the multisectional mattress assembly 110 and capable of providing, among other benefits, sufficient support for a patient residing in the medical bed 100. The orifice traversing the removable fenestrated support 120 is in operable connection with the sealable orifice of multisectional mattress assembly 110 and, in embodiments, is sufficiently equivalently dimensioned and sized in comparison with the sealable orifice of multi-sectional mattress assembly 110. As such, the respective orifices may form a continuum that traverses the multisectional mattress assembly 110 and the removable fenestrated support 120.

As further shown in FIG. 1, the medical bed 100 also includes a first removable reservoir, such as a removable fluid collection support 130 having an orifice and positioned below the removable fenestrated support 120. In further aspects, the orifices of the multisectional mattress assembly 110, the removable fenestrated support 120, and the removable fluid collection support 130 are each sufficiently equivalently dimensioned and sized such that the respective orifices form a continuum that traverses each of the multi-sectional mattress assembly 110, the removable fenestrated support 120, and the removable fluid collection support 130. The medical bed 100 may also include a bed frame 140 having one or more of a headboard 141, a footboard 142, and a plurality of bed posts or legs 143. The bed frame 140 is illustrated with four of the legs 143, although the number thereof may be adjusted based on patient size or other considerations. In embodiments, the bed frame 140 is arranged such that the continuum traversing the multisectional the mattress assembly 110, the removable fenestrated support 120, the removable fluid collection support 130, and the bed frame 140 is strategically positioned for operably contacting or directing contents to a second removable reservoir. For example, the second removable reservoir may be a removable fluid collection reservoir 150, as shown in FIG. 1. Although illustrated as having a circular cross-section, the circumferential, separable section 112 and corresponding orifices of the medical bed 100 may have any other suitable cross-section, such as a triangular, a square, or a polygonal cross-section.

In embodiments, materials and/or compositions for incorporation into any of the components of medical bed 100 may be selected based on parameters including performance, cost, availability, among others. For instance, the removable fluid collection support 130 of some embodiments may include one or more materials selected from a polymeric composition, a fibrous composition, a metallic composition, a gelatinous composition, a ceramic composition, and combinations thereof. Similarly, any of the multisectional mattress assembly 110, the removable fenestrated support 120, the bed frame 140, and the removable fluid collection reservoir 150 may include one or more polymeric, fibrous, metallic, gelatinous, and/or ceramic materials known to the skilled artisan.

In additional aspects of FIG. 1, a removable conduit 160, which is optionally equipped with one or more sealable hatches such as a sealable hatch 161, is positioned within and vertically traversing the sealable orifice upon the unsealing of the sealable orifice. The removable conduit 160 may be further equipped with removable and mountable hardware, braces, and/or frame(s) for better preserving the positioning of the removable conduit 160, for instance, during the production of excreta-based waste by the patient. In similar embodiments, the removable conduit 160 may further and beneficially include a toilet seat that may be permanently affixed to the removable conduit 160 or may be detachable from the removable conduit 160. Aspects of the present disclosure further provide for the permanent placement of the removable conduit 160, such as under conditions where the cleaning and/or sterilization of the removable conduit 160 and any associated or supporting equipment (such as the sealable hatch 161 and any accompanying hardware, braces, frame(s)) is not readily performable, including instances where the medical bed is transiently occupied by one or more patients. In such embodiments, the circumferential, separable section 112 of the multisectional mattress assembly 110 may be eliminated from the medical bed 100 to increase an ease of use of the medical bed 100.

As further disclosed at FIG. 1, optional equipment for enhancing the comfort and/or serviceability of the patient may be incorporated into the medical bed 100. In non-limiting aspects, the optional equipment may include a hospital bed trapeze 170, which may further include one or more of a mountable trapeze bar 171, a shower head 172, a pulley 173, one or more trapeze rings 174, and/or a feeding tray 175. The hospital bed trapeze 170 may include any one or more of the foregoing components, such as the mountable trapeze bar 171, the shower head 172, the pulley 173, the trapeze ring(s) 174, and/or the feeding tray 175, as well as any additional components for enhancing the comfort and/or recuperation of the patient. The medical bed 100 of these embodiments may this include enhanced functionality for patient care, while still providing cost-effective and innovative adaptions that can be extended to patients at their homes or other health care facilities without costly mechanized medical beds.

As introduced, the medical bed 100 may include a multisectional mattress assembly consisting of 1) two separable and interlockable halves as shown via elements 111 and 113 of FIG. 1; and 2) a single separable, central section enveloped by the two separable and interlockable halves in accordance with, for example, element 112 of FIG. 1. The multisectional mattress assembly 110 is, in some embodiments, beneficially capable of being manipulated such that the single separable, central section 112 is reversibly removed for easily relocating and/or repositioning the patient. For example, the patient may be relocated from exclusively contacting and residing atop the multisectional mattress assembly 110 to at least partially contacting the removable fenestrated support 120, or (in aspects where the removable fenestrated support 120 is absent or transiently removed or unavailable due to cleaning or sterilization) the removable fluid collection support 130.

For instance, relocating and/or repositioning the patient as described in the foregoing may be advantageous during one or more of bathing activities, excreta activities, physical examination activities, medical assessment activities, dressing activities, feeding activities, and combinations thereof. Indeed, the medical bed 100 disclosed herein improves optimization of both 1) patient comfort and safety and 2) the capacity for the caregiver(s) to best perform the one or more above-referenced activities, any of which may be performed in the presence of the removable fluid collection reservoir 150 positioned below medical bed 100 as described herein. Any fluids or liquids generated during patient care may therefore be directed to an upper surface of the removable fluid collection support 130, which may include sloped walls for preventing stagnation and directing flow to the removable fluid collection reservoir 150. The patient relocation and/or repositioning disclosed herein may include, for example, rolling the patient on their side such that the patient is orthogonal or approximately orthogonal to a (horizontally) planar surface of the medical bed 100, the multisectional mattress assembly 110, and so forth. In certain embodiments, the patient has a smaller contact area when laying on their side or in a lateral decubitus position than when laying in a supine or prone position, thus providing additional open area for a caregiver to interact with the medical bed 100.

In further aspects, the single separable, central section 112 of multisectional mattress assembly 110 is kept intact, and the patient is relocated and/or repositioned such that the patient is orthogonal or approximately orthogonal to the (horizontally) planar surface of medical bed 100. In such aspects, the caregiver(s) may separate the two separable and interlockable halves 111, 113 of multisectional mattress assembly 110 for removing one of the halves. After this removal, the caregiver(s) may position the patient directly and exclusively on the removable fenestrated support 120 or (for instances where removable fenestrated support 120 is not present or is otherwise unavailable) the removable fluid collection support 130. In related embodiments, the single separable, central section 112 of the multisectional mattress assembly 110 may then be removed for performing one or more of bathing activities, excreta activities, physical examination activities, medical assessment activities, dressing activities, feeding activities, and combinations thereof, optionally in operable connection with the removable fluid collection reservoir 150. As will be apparent to the skilled artisan, the myriad partitioning and positioning options available with multisectional mattress assembly 110 described herein, including the optional removal of one, two, three or more sections of the multisectional mattress assembly, allow for ease in patient care, as well as cleaning, sterilization, and more of components of the medical bed 100, including but not limited to the multisectional mattress assembly 110. Indeed, further examples of a patient positioning process for conveniently removing the multisectional mattress assembly 110 are discussed below, with reference to FIGS. 6-9.

As noted herein, the removable fenestrated support 120 and the removable fluid collection support 130 may be constructed using various appropriate materials, including one or more of a polymeric composition, a fibrous composition, a metallic composition, a gelatinous composition, and a ceramic composition. In certain embodiments, the supports 120, 130 may include one or more water resistant and/or water repellant materials, including one or more water permeable, water resistant, and/or water repellant versions of the foregoing compositions for beneficially facilitating bathing and excreta activities, for better directing any liquids and fluids associated with such activities to the removable fluid collection reservoir 150 described herein, for minimizing risk of contagion, and more. In embodiments, the selection of one or more materials for constructing the removable fenestrated support 120 and/or the removable fluid collection support 130 is based on the capacity of the materials to support one or more of the patient, the multisectional mattress assembly 110, and any additional components that may contribute additional weight or physical stress to the supports 120, 130.

In additional aspects, the removable fluid collection reservoir 150 may be equipped with one or more of casters/caster wheels, one or more valves or outlets, one or more drains, and/or a pumping system (not shown). For example, the casters or caster wheels may beneficially allow for ease of movement related to removable fluid collection reservoir 150, while the incorporation of one or more valves or outlets, one or more drains and/or a pumping system advantageously benefits cleaning, draining, sterilization, and other activities associated with the operation and maintenance of the removable fluid collection reservoir 150. The removable fluid collection reservoir 150 is illustrated with a generally open top side to facilitate collection therein. In other embodiments, the removable fluid collection reservoir 150 may be formed with an orifice through an otherwise closed top side, thereby forming a close fit with the orifice of the removable fluid collection support 130, which may function as a funnel or drain plate.

In embodiments, the medical bed 100 may be further equipped with one or more sensors and/or cameras (not shown) for best providing patient care, such as when constant direct surveillance of the patient may not be possible. In related aspects, sensors and/or cameras for use in disclosed medical bed 100 may communicate with one or more caregivers operating equipment including any one or more of monitors, CPUs, or other sensor controllers in signal communication with the sensors and/or cameras. As used herein, "signal communication" refers to electric communication such as hard wiring two components together or wireless communication, as understood by those skilled in the art. For example, wireless communication may be WiFi®, Bluetooth®, Zigbee, or forms of near-field communications. In addition, signal communication may include one or more intermediate controllers or relays positioned between elements that are in signal communication with one another.

Figure 2:
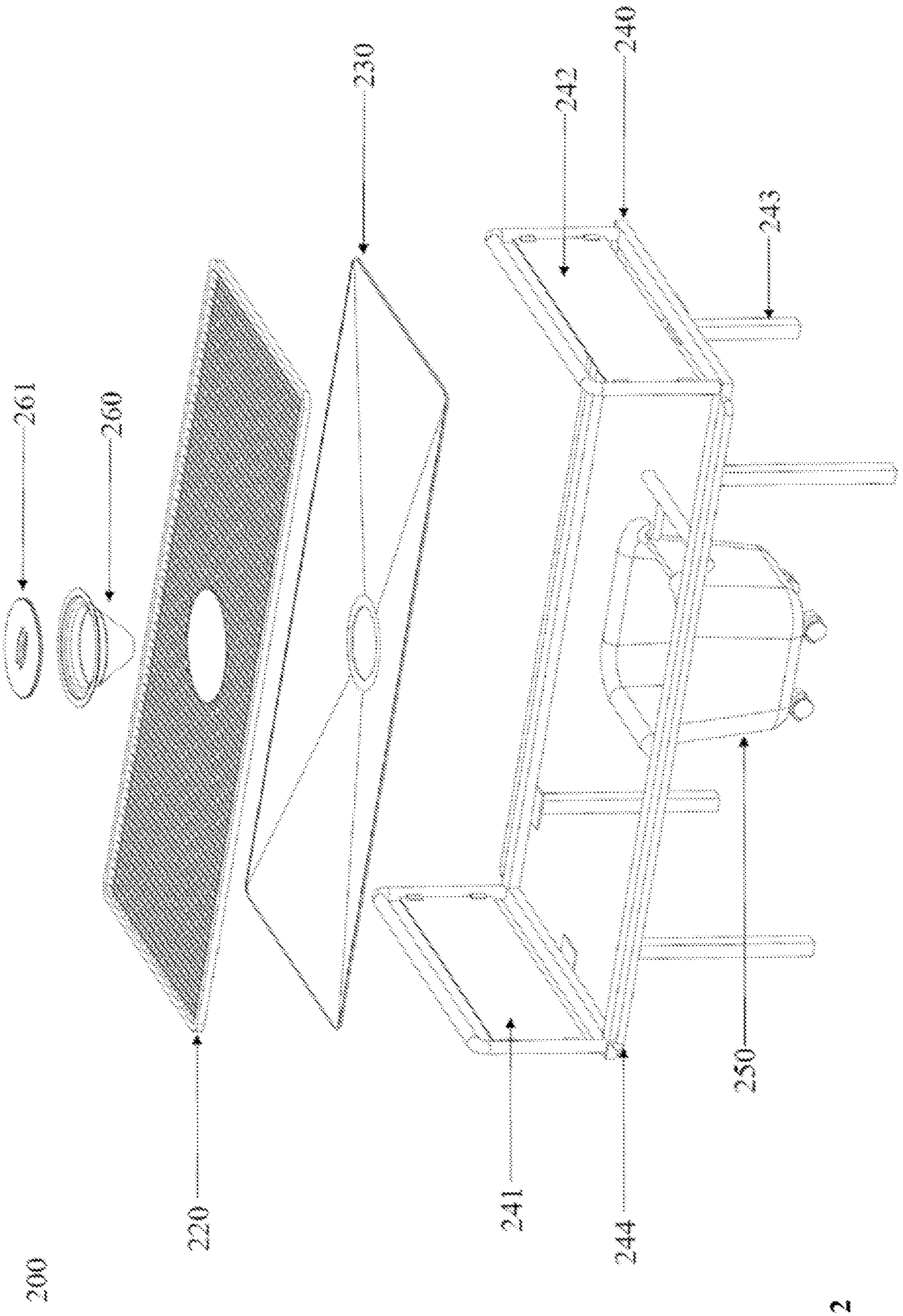
FIG. 2 is another exploded schematic diagram illustration of a medical bed, according to certain embodiments of the disclosure.

FIG. 2 is a schematic diagram illustration of certain aspects of a medical bed 200 as described herein, which may include a removable fenestrated support 220, a first removable reservoir such as a removable fluid collection support 230, a bed frame 240 further including one or more of a headboard 241, a footboard 242, a plurality of bed posts or legs 243, and/or one or more bed rails 244. The plurality of bed posts or legs 243 may generally include four legs, although this number may be adjusted to better accommodate patients characterized by one or more of exceptional height and/or weight. A second removable reservoir, such as a removable fluid collection reservoir 250, may be positioned below the medical bed 200 and in operable connection with a removable conduit 260 including one or more sealable hatches 261 through an orifice, which may be fluidly coupled to corresponding orifices in the removable fenestrated support 220 and the removable fluid collection support 230, as illustrated in FIG. 2.

As will be appreciated by those of skill in the relevant art, the sealable hatch 261 may be latched, threaded, or otherwise attached to the removable conduit 260, while the removable conduit 260 may, in embodiments, include multiple, sealable hatches, including sealable hatches on each opposing end/opening of the removable conduit 260. In further aspects, the removable conduit 260 may further be equipped with a removable toilet seat, or an affixed toilet seat as described herein for enhancing patient care and comfort. In some embodiments, the configuration disclosed in FIG. 2 represents a reduced, alternative configuration for supporting a patient, such as during showering or bathing of the patient where the presence of a multisectional mattress assembly (not shown) is not required.

Figure 3:
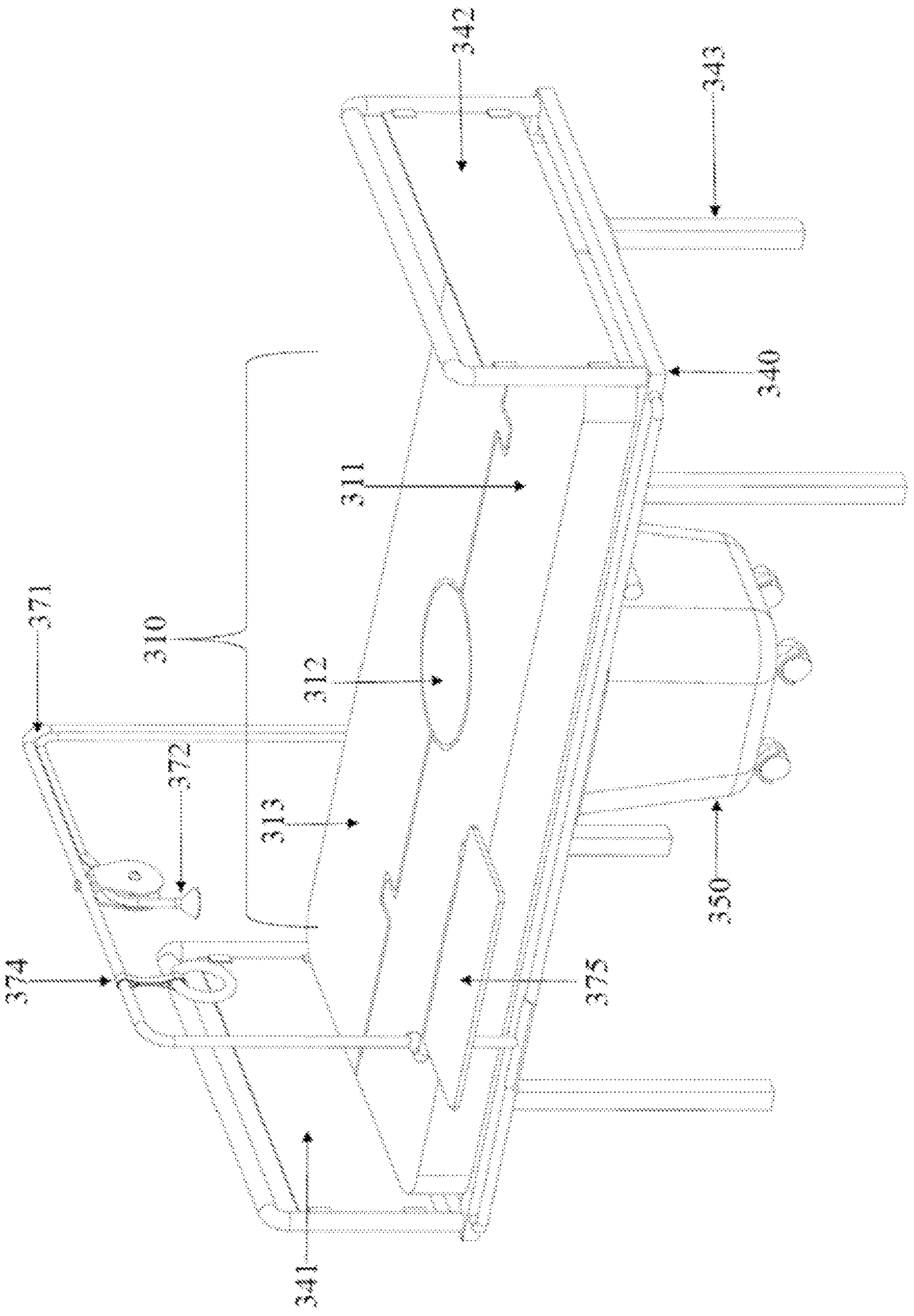
FIG. 3 is a schematic diagram illustration of a medical bed having a multisectional mattress assembly, according to certain embodiments of the disclosure.

FIG. 3 discloses various embodiments in accordance with a medical bed 300. In some aspects, medical bed 300 includes a multisectional mattress assembly 310 including three separable sections, including two separable, longitudinal sections 311 and 313, and circumferential, separable section 312 capable of forming a cover or a sealant for a sealable orifice positioned within and vertically traversing the multisectional mattress assembly 310. As illustrated, the two separable, longitudinal sections 311 and 313 may include interlocking features, such as a rectangular protrusion and a corresponding rectangular recess, that facilitate a tighter friction fit between the sections 311, 313. In other embodiments, the interlocking features may be constructed with any other suitable shape, such as a triangular protrusion and corresponding triangular recess. The multisectional mattress assembly 310 may be provided with any suitable number of interlocking features, in certain embodiments. Moreover, in the illustrated, embodiment, the sections 311, 313 have the same general shape, such that a single, streamlined manufacturing process may be used to create both of the sections 311, 313, before one section is repositioned or rotated to interface with the remaining section.

Additionally, the medical bed 300 may further include a bed frame 340 further including at least one of a headboard 341, a footboard 342, and a plurality of bed posts or legs 343. The medical bed 300 may further include a removable reservoir, such as a removable fluid collection reservoir 350, which may be constructed from materials selected from polymeric, fibrous, metallic, gelatinous and/or ceramic materials as further described herein. As disclosed at FIG. 3, the medical bed 300 may optionally include additional equipment for enhancing the comfort and/or serviceability of the patient including a mountable trapeze bar 371, a shower head 372 that is optionally supported by and mounted in a pulley 373, one or more trapeze rings 374, and/or a feeding tray 375.

Figure 4:
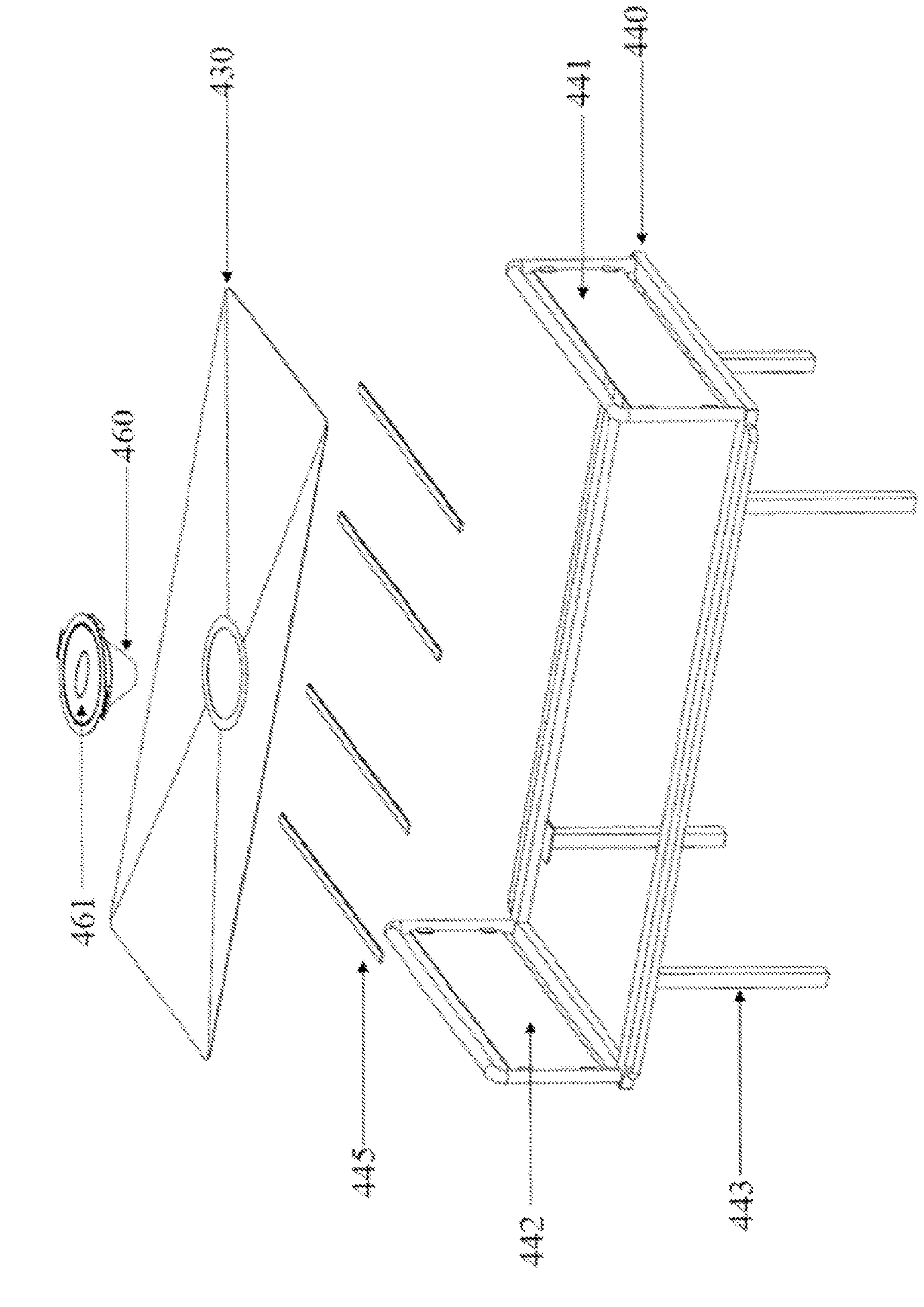
FIG. 4 is a partially exploded schematic diagram illustration of a medical bed, according to certain embodiments of the disclosure.

FIG. 4 is a simplified diagram illustrating an alternative configuration of certain aspects of a medical bed 400 in accordance with the present disclosure. In embodiments, the medical bed 400 may include a removable reservoir such as a removable fluid collection 430, a bed frame 440 further including one or more of a headboard 441, a footboard 442, and a plurality of bed posts or legs 443 (which, as previously noted herein, generally includes four legs but which may be adjusted to better accommodate, for example, patients of exceptional height and/or weight). The medical bed 400 may also include a plurality of bed frame slats 445 in certain embodiments. In alternative embodiments, the medical bed 400 may instead include a single, slatted bed base or slatted mattress base. In some aspects, the configuration disclosed in FIG. 4 represents a minimal configuration for supporting a patient, for example, during the cleaning, sterilization, or other maintenance of one or more of a multisectional mattress assembly, a removable fenestrated support, a removable conduit including one or more of at least one sealable hatch and a removable toilet seat, and/or additional medical bed components as described herein.

Figure 5:
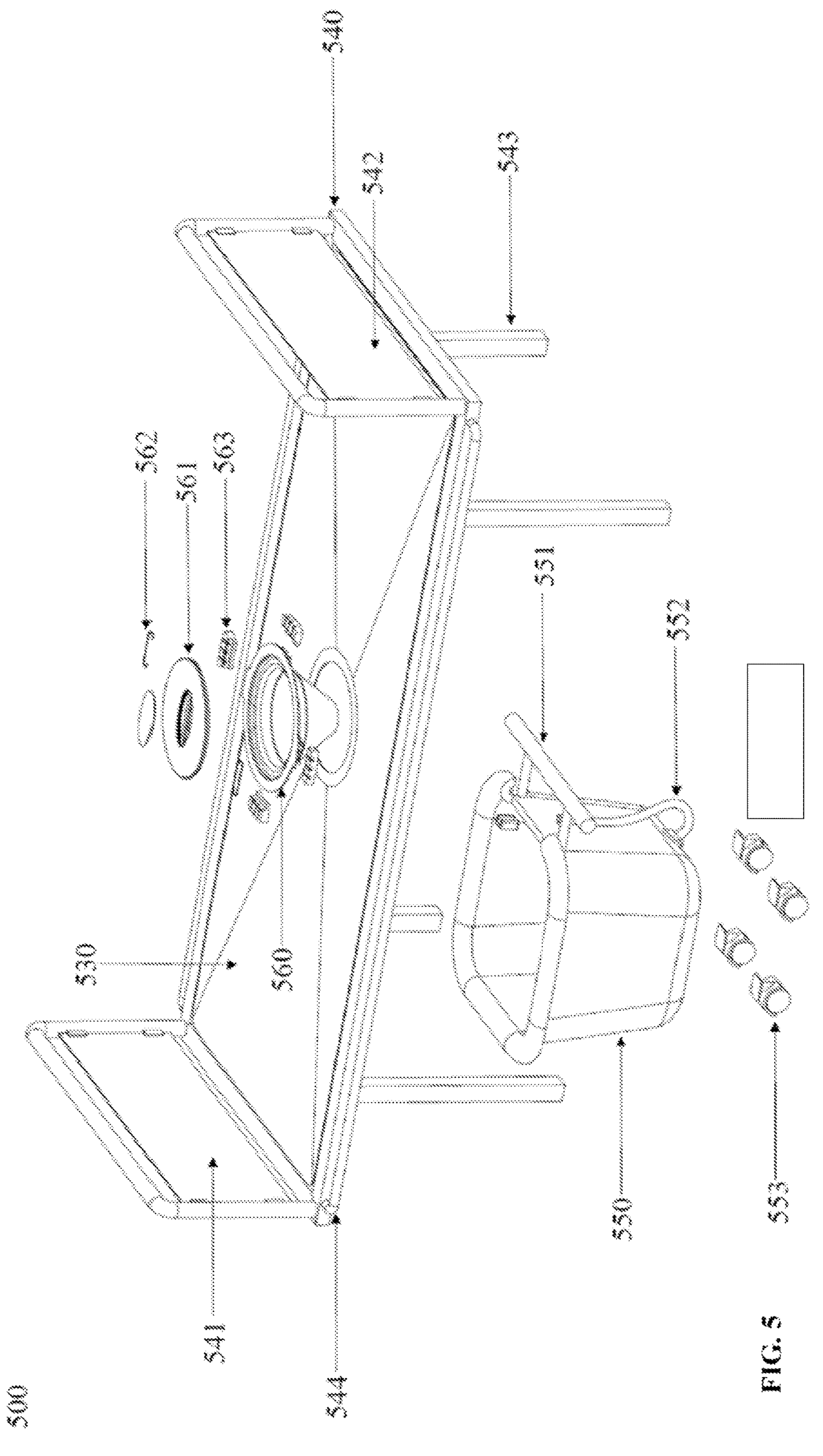
FIG. 5 is a partially exploded schematic diagram illustration of a medical bed having removable reservoirs, according to certain embodiments of the disclosure.

FIG. 5 is a schematic diagram illustration of a medical bed featuring certain alternative aspects and optional components in accordance with a medical bed of the present disclosure. For instance, in accordance with certain embodiments, a medical bed 500 may include a first removable reservoir such as a removable fluid collection support 530, a bed frame 540 further including one or more of a headboard 541, a footboard 542, and a plurality of bed posts or legs 543. The medical bed 500 may also include a second removable reservoir such as a removable fluid collection reservoir 550 that is optionally equipped with one or more of a mounted handle 551, a hose and valve system 552 that may be connected to one or more of a pumping system, a drainage system (including a sewer or septic disposal system) or a medical waste container for safely disposing of excreta- and/or non-excreta based waste, and a set of casters 553 for conveniently manipulating the position of removable fluid collection reservoir 550. In further aspects, the medical bed 500 includes a removable conduit 560 including one or more sealable hatches 561 that is positionable within an orifice including sufficient openings, for instance, in a removable fluid collection support 530, as shown in FIG. 5.

In additional aspects, the removable conduit 560 may beneficially utilize one or more brackets, frames, clips, or other support devices for enhancing its positioning and stability, as well as for securing one or more sealable hatches 561. For example, the medical bed 500 of certain embodiments may include, in non-limiting embodiments, one or more brackets 562 and/or one or more mounts 563. As previously described herein, the sealable hatch 561 may be latched, threaded, or otherwise attached to the removable conduit 560, while the removable conduit 560 may, in aspects, include multiple, sealable hatches, such as sealable hatches on each opposing end/opening of removable conduit 560. In still further aspects, removable conduit 560 may further be equipped with a removable toilet seat, or an affixed toilet seat as described herein for enhancing patient care and comfort. In embodiments, the configuration disclosed in FIG. 5 represents a minimal configuration for supporting a patient during the cleaning, sterilization, or other maintenance of one or more of a multisectional mattress assembly, a removable fenestrated support and/or additional medical bed components as described herein.

To facilitate further understanding, FIGS. 6-9 are provided to illustrate a patient positioning sequence or process that enables removal of the multisectional mattress assembly from the medical bed, while maintaining patient comfort and reducing risk of injury to the patient or the caregiver. The positioning sequence may be easily performed to transition the medical bed from a normal resting configuration to a reduced configuration suitable for bathing, showering, or other activities that may be more efficient without the multisectional mattress assembly beneath the patient.

Figure 6:
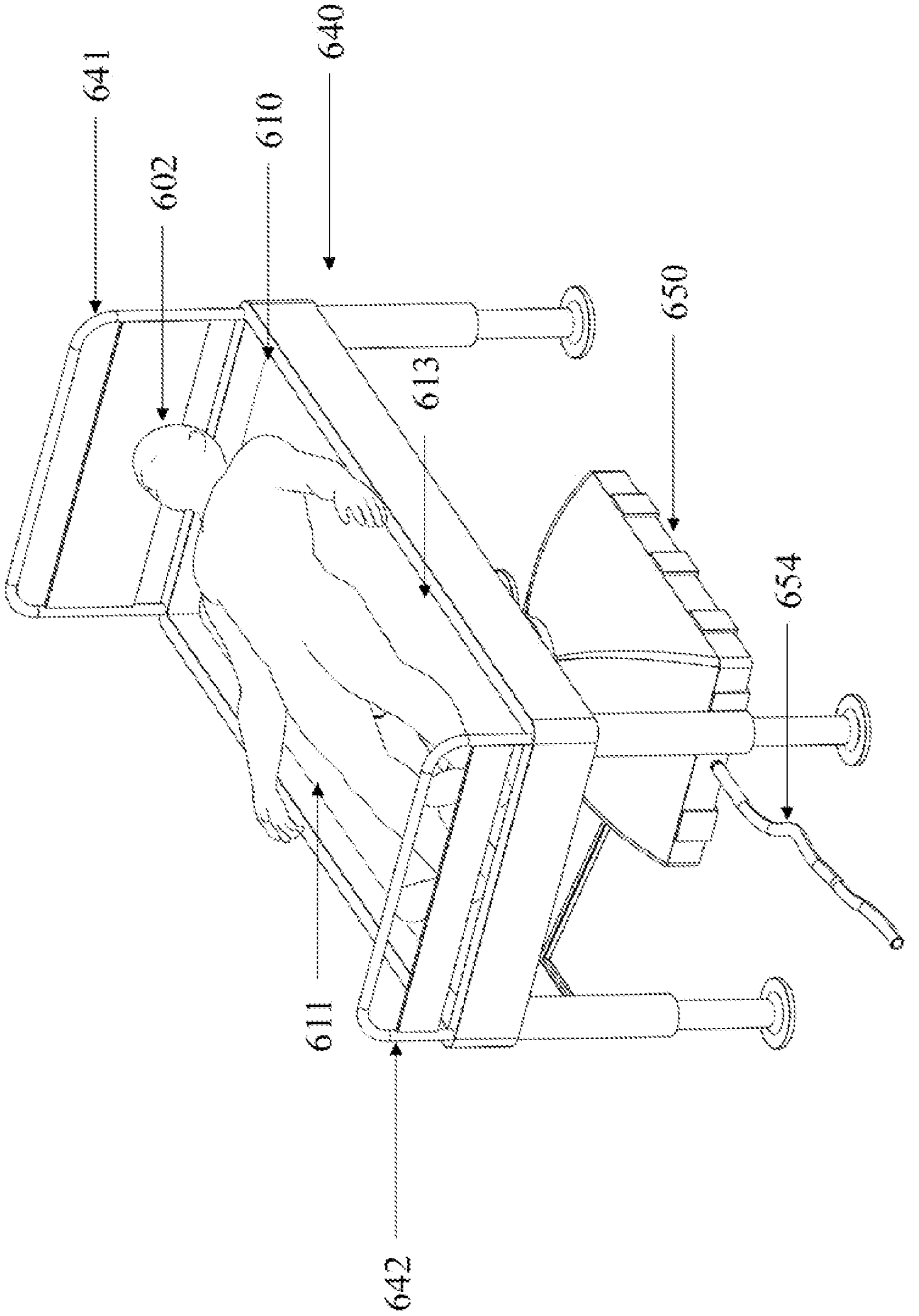
FIG. 6 is a schematic diagram illustration of a medical bed having a patient positioned on a multisectional mattress assembly, according to certain embodiments of the disclosure.

FIG. 6 is a schematic diagram illustration of certain aspects of a medical bed 600 as described herein, including a patient 602 positioned on a multisectional mattress assembly 610 of the medical bed 600. In certain embodiments, the configuration disclosed in FIG. 6 represents a normal operating state of the medical bed 600, on which the patient 602 may rest comfortably. The patient 602 is illustrated as laying in a prone position, on top of two separable, longitudinal sections 611 and 613 of the multisectional mattress assembly 610. As discussed above, a circumferential, separable section of the multisectional mattress assembly 610 may be positioned between the two separable, longitudinal sections 611, 613 and directly beneath the patient 602. The multisectional mattress assembly 610 is in contact with a bed frame 640 of the medical bed 600, which may include any suitable combination of features as described above. For example, a headboard 641, a footboard 642, and/or other patient supporting components may be selectively included in the medical bed 600 to establish a cost-effective support system for the patient 602. As illustrated, the medical bed 600 may also include a removable fluid collection reservoir 650, which may fluidly couple to at least one conduit 654 for facilitating fluid removal or cleaning of the removable fluid collection reservoir 650.

Figure 7:
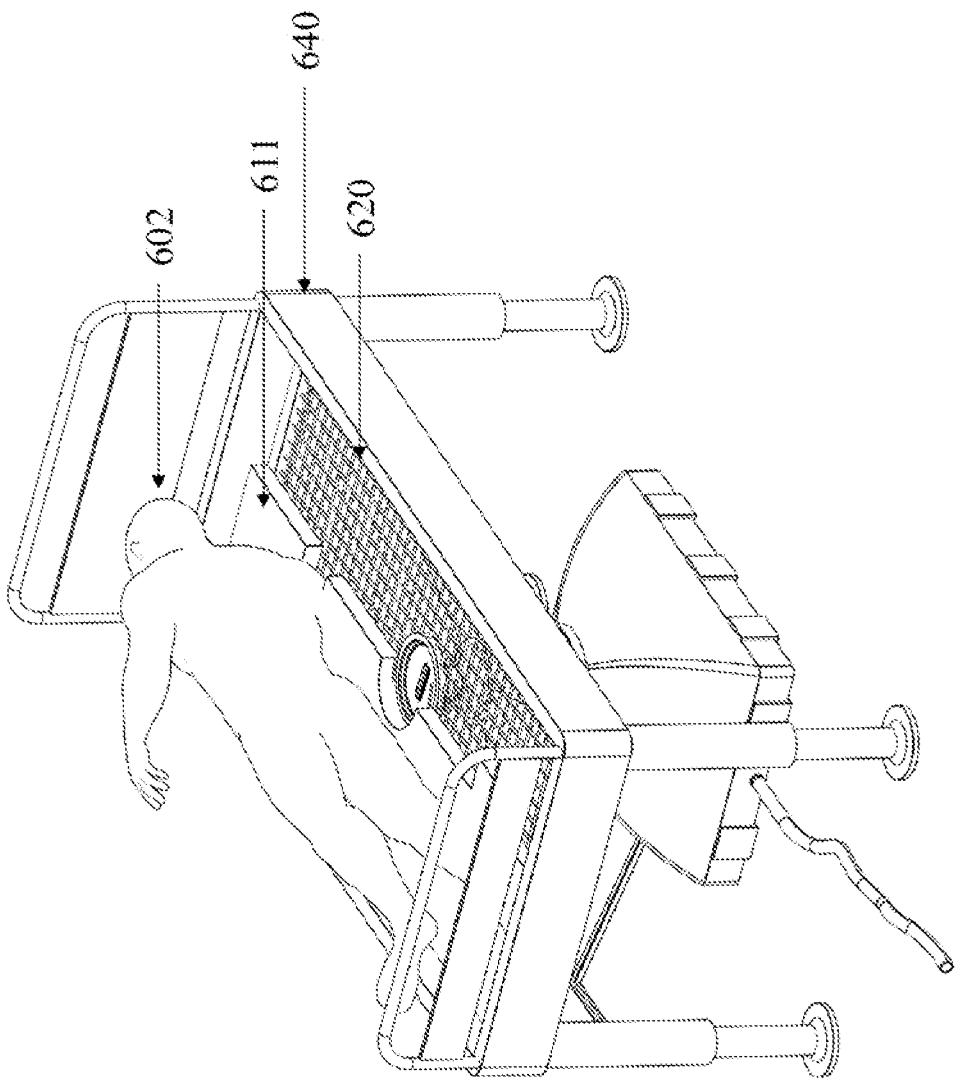
FIG. 7 is a schematic diagram illustration of the medical bed in which the patient is positioned on a first side of bed to facilitate removal of a mattress section from a second side of the bed, according to certain embodiments of the disclosure.

FIG. 7 is a schematic diagram illustration of certain aspects of the medical bed 600 as described herein, in which the patient 602 is rolled to a lateral position to facilitate removal of the second separable, longitudinal section 613 of the multisectional mattress assembly 610. That is, by rolling or otherwise guiding the patient 602 onto the first separable, longitudinal section 611 of the multisectional mattress assembly 610, the second separable, longitudinal section 613 is exposed for efficient removal by a caretaker, thus revealing a removable fenestrated support 620. In certain embodiments, a circumferential, separable section of the multisectional mattress assembly 610 is also removed at this step in the patient positioning process. In other embodiments, the circumferential, separable section may be efficiently removed at an earlier or later step, such as before removal of the second separable, longitudinal section 613, in line with the above disclosure.

Figure 8:
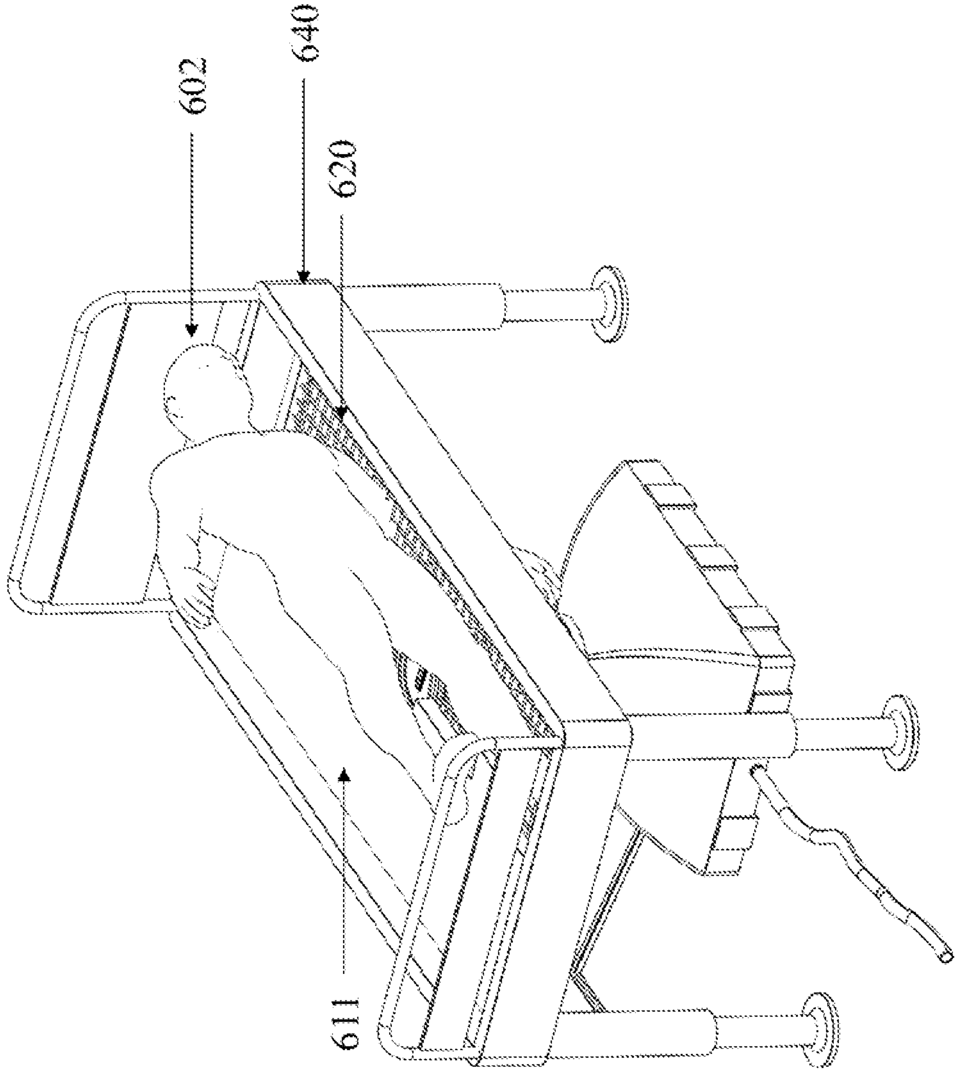
FIG. 8 is a schematic diagram illustration of the medical bed in which the patient is positioned on the second side of bed to facilitate removal of another mattress section from the first side of the bed, according to certain embodiments of the disclosure.

FIG. 8 is a schematic diagram illustration of certain aspects of the medical bed 600 as described herein, in which the patient 602 is rolled to in an opposed lateral position to facilitate removal of the remaining first separable, longitudinal section 611 of the multisectional mattress assembly 610. For example, the patient 602 may be positioned on an exposed surface of the removable fenestrated support 620, which was previously covered by the second separable, longitudinal section 613. Thus, the first separable, longitudinal section 611 of the multisectional mattress assembly 610 is exposed for removal.

Figure 9:
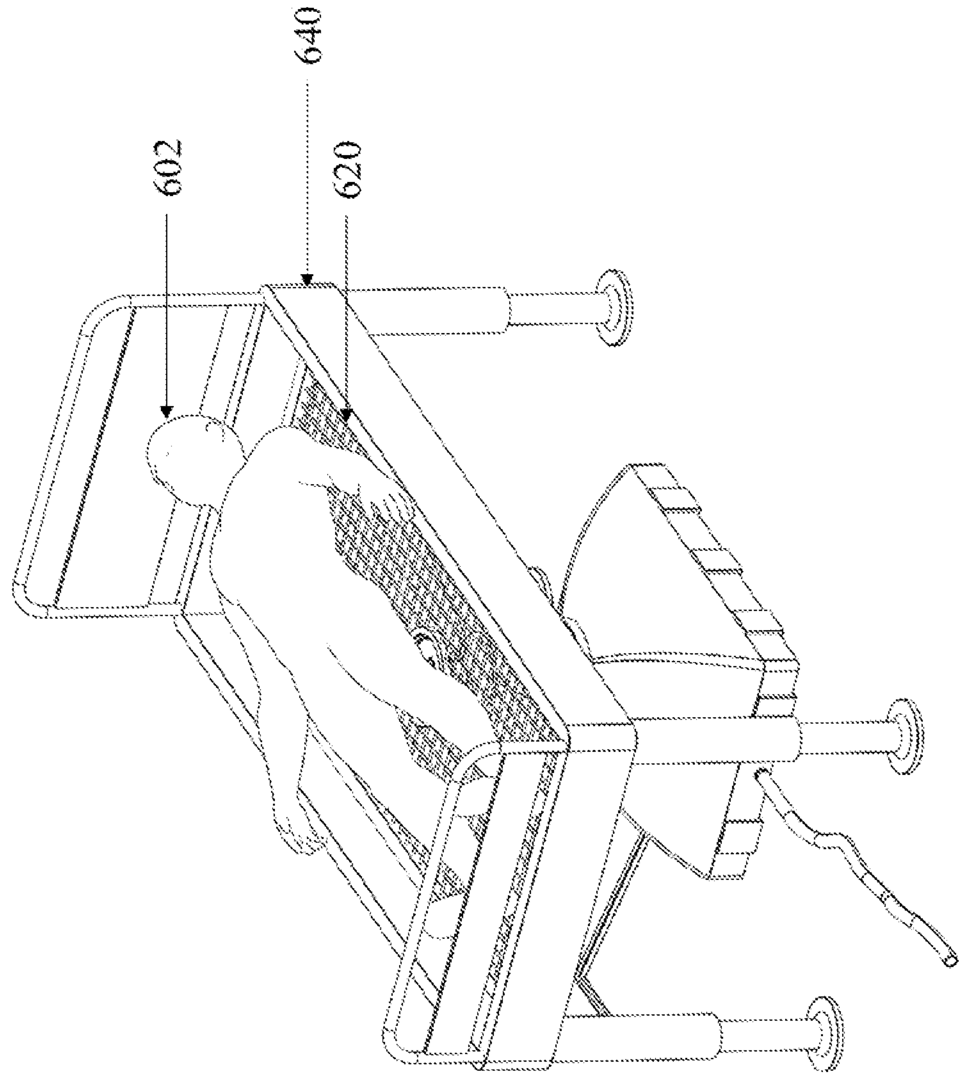
FIG. 9 is a schematic diagram illustration of the medical bed in which the multisectional mattress assembly has been removed from the bed frame, according to certain embodiments of the disclosure.

FIG. 9 is a schematic diagram illustration of certain aspects of the medical bed 600 as described herein, including the patient 602 positioned on the medical bed 600 with the multisectional mattress assembly 610 removed therefrom. As such, the disclosed embodiments of the medical bed 600 permits for changes or transformations between various operating states, such that patient comfort is maintained regardless of which caregiving activities are to be performed. In certain embodiments, the reverse process may be performed to reinstall the multisectional mattress assembly 610 on the medical bed 600. For example, the patient 602 may be positioned onto a first lateral side while a first separable, longitudinal section 611 of the multisectional mattress assembly 610 is installed in an exposed portion of the removable fenestrated support 620, and then the patient 602 may be positioned on a second lateral side while a second separable, longitudinal section 613 of the multisectional mattress assembly 610 is installed in a remaining exposed portion of the removable fenestrated support 620. Accordingly, the disclosed embodiments of medical beds provide comprehensive, integrated, and modular features for facilitating patient comfort and safety, across a wide variety of caregiving activities.

Although specific terms and phrases are incorporated herein, any such terms and phrases are used in a descriptive sense only and not for the purposes of limitation. Embodiments of medical beds and methods have been described in considerable detail with specific reference to the illustrated embodiments and aspects of the present disclosure. However, it will be apparent to those of skill in the art that various modifications and changes may be employed within the spirit and scope of the embodiments of medical beds and methods as described in the foregoing specification, and such modifications and changes are to be considered equivalents and part of this disclosure.

What is claimed is:

1. A medical bed comprising:

a multisectional mattress assembly having two or more separable longitudinal sections separated along an entire length of the medical bed and a sealable orifice positioned within and vertically traversing the multisectional mattress assembly;

a removable fenestrated support dimensionally aligned and positioned below the multisectional mattress assembly and having a first orifice in operable contact with the sealable orifice;

a first removable reservoir having a second orifice in operable contact with the sealable orifice and the first orifice, the first removable reservoir being positioned below the removable fenestrated support;

a bed frame with a plurality of bed frame supports configured to support the multisectional mattress assembly and the removable fenestrated support; and a second removable reservoir positioned below the bed frame.

2. The medical bed of claim 1, wherein the sealable orifice includes at least one separable section of the multisectional mattress assembly, and wherein the multisectional mattress assembly comprises two separable longitudinal sections, and wherein the sealable orifice is further positioned between the two separable longitudinal sections.

3. The medical bed of claim 2, wherein the sealable orifice is configured to receive a removable conduit positioned within and vertically traversing the sealable orifice upon removal of the at least one separable section of the multisectional mattress assembly.

4. The medical bed of claim 3, wherein the removable conduit and the sealable orifice are integrated within the at least one separable section of the multisectional mattress assembly.

5. The medical bed of claim 3, wherein the removable conduit includes a removable toilet seat.

6. The medical bed of claim 3, wherein the removable conduit includes one or more sealable hatches.

7. The medical bed of claim 1, wherein the multisectional mattress assembly includes one or more longitudinal seams, latitudinal seams, diagonal seams, circumferential seams, or combinations thereof, wherein each of the two or more separable longitudinal sections includes one or more interlockable portions to matingly interface with a corresponding separable longitudinal section.

8. The medical bed of claim 1, wherein the two or more separable longitudinal sections of the multisectional mattress assembly are connected by one or more of a zipper based fastener, a button based fastener, a metal snap based fastener, a clip based fastener, and a hook and loop fastener.

9. The medical bed of claim 1, wherein the multisectional mattress assembly includes three separable sections.

10. The medical bed of claim 1, wherein the second removable reservoir is partitioned to receive separate excreta based waste and non-excreta based waste.

11. The medical bed of claim 1, wherein the second removable reservoir includes a dedicated section for excreta based waste.

12. The medical bed of claim 1, wherein the medical bed is selected from a manual bed, a Gatch bed, a burn recovery bed, a ward bed, and a field hospital bed.

13. The medical bed of claim 1, further comprising a headboard, a footboard, and a removable caster wheel assembly operably connected to the medical bed.

14. The medical bed of claim 1, further comprising one or more of a hospital bed trapeze, a medical trapeze, an overhead trapeze, one or more bed assist rails, an adjustable medical bedside table, and a medical bedside tray.

15. The medical bed of claim 1, wherein the first removable reservoir and the second removable reservoir are made of a polymeric composition, a fibrous composition, a metallic composition, a gelatinous composition, a ceramic composition, or combinations thereof.

16. The medical bed of claim 1, further comprising one or more of a medical bed sensor, a moisture sensor, a pressure sensor, and a thermal sensor.

17. A method for repositioning and stabilizing an infirm individual for one or more caregiving activities, the method comprising:

positioning the individual on a medical bed comprising a multisectional mattress assembly having two or more separable sections and a sealable orifice positioned within and vertically traversing the multisectional mattress assembly;

moving the individual from a first position on the multisectional mattress assembly to a second position on the multisectional mattress assembly for accessing the sealable orifice;

unsealing the sealable orifice by removing the separable section in the sealable orifice of the multisectional mattress assembly;

moving the individual to a third position to optimize contact with the sealable orifice for performing a caregiving activity;

repositioning the individual in the second position following the performance of the caregiving activity;

resealing the sealable orifice by replacing the separable section of the multisectional mattress assembly; and returning the individual to the first position on the multisectional mattress assembly.

18. The method of claim 17, wherein the caregiving activity can include one or more of a bathing activity, an excretory activity, a physical examination, a medical assessment, a dressing activity, a feeding activity, and combinations thereof.

19. The method of claim 17, wherein unsealing the sealable orifice by removing at least one separable section of the multisectional mattress assembly further comprises introducing a removable conduit in operable contact with a second removable reservoir positioned below a bed frame of the medical bed.

20. A method of assembling a medical bed, comprising:

providing a bed frame configured to support a patient;

positioning, on the bed frame, a fluid collection support having at least one sloped wall and a first orifice defined through the at least one sloped wall;

positioning, on the fluid collection support, a fenestrated support having a second orifice defined therethrough;

positioning, on the fenestrated support, a multisectional mattress assembly having two or more separable longitudinal sections separated along an entire length of the medical bed and a sealable orifice positioned within and vertically traversing the multisectional mattress assembly;

dimensionally aligning the fluid collection support for operable contact with the sealable orifice and the second orifice; and positioning, below the bed frame, a second removable reservoir dimensionally aligned to receive fluid generated during use of the medical bed via a flow path defined between the first orifice, the second orifice, and the sealable orifice.

* * * * *